(12) United States Patent
Guay et al.

(10) Patent No.: US 9,397,954 B2
(45) Date of Patent: Jul. 19, 2016

(54) SYSTEM AND METHOD FOR SUPPORTING LIVE MIGRATION OF VIRTUAL MACHINES IN AN INFINIBAND NETWORK

(71) Applicant: Oracle International Corporation, Redwood Shores, CA (US)

(72) Inventors: Wei Lin Guay, Penang (MY); Bjørn Dag Johnsen, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 436 days.

(21) Appl. No.: 13/837,922

(22) Filed: Mar. 15, 2013

(65) Prior Publication Data

US 2013/0254368 A1    Sep. 26, 2013

Related U.S. Application Data

(60) Provisional application No. 61/615,731, filed on Mar. 26, 2012.

(51) Int. Cl.
*H04L 12/917* (2013.01)
*H04L 12/931* (2013.01)
*G06F 9/455* (2006.01)
*G06F 9/48* (2006.01)

(52) U.S. Cl.
CPC ............ *H04L 47/76* (2013.01); *G06F 9/45533* (2013.01); *G06F 9/45558* (2013.01); *G06F 9/4856* (2013.01); *H04L 49/358* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 7,093,024 B2 | 8/2006 | Craddock et al. | |
| 7,962,564 B2 | 6/2011 | Errickson et al. | |
| 7,970,913 B2 * | 6/2011 | Machulsky et al. | 709/227 |
| 7,996,583 B2 | 8/2011 | Wilkinson | |
| 8,150,971 B2 | 4/2012 | Lublin et al. | |
| 8,266,275 B2 | 9/2012 | Xu et al. | |
| 8,331,381 B2 | 12/2012 | Brown et al. | |
| 8,407,182 B1 | 3/2013 | Rajaa et al. | |
| 8,429,647 B2 | 4/2013 | Zhou et al. | |
| 8,589,921 B2 | 11/2013 | Heim | |
| 8,700,811 B2 | 4/2014 | Oshins et al. | |
| 8,862,538 B2 * | 10/2014 | Patil et al. | 707/607 |
| 8,935,506 B1 * | 1/2015 | Gopalan | 711/202 |
| 8,972,988 B2 | 3/2015 | Ikegami et al. | |
| 9,104,645 B2 | 8/2015 | Dawkins et al. | |
| 9,253,014 B2 | 2/2016 | Miki et al. | |
| 9,304,798 B2 | 4/2016 | Mudigonda et al. | |

(Continued)

OTHER PUBLICATIONS

Clark, et al., Live Migration of Virtual Machines, Proceedings of the Symposium on Networked Systems Design and Implementation, Jan. 1, 2005, pp. 273-286, USENIX Association, Berkeley, CA, USA. Relevant pages: Abstract; Section 3.1.

(Continued)

*Primary Examiner* — Patrice Winder
(74) *Attorney, Agent, or Firm* — Tucker Ellis LLP (57) ABSTRACT

A system and method can support virtual machine live migration in a network. A plurality of hosts can be interconnected via the network. Each host contains one or more virtual machines. At least one virtual machine operates to perform a live migration from a first host to a second host. The virtual function, which is attached to a queue pair (QP), can be supported by a host channel adapter (HCA) on a host.

20 Claims, 9 Drawing Sheets

(56) References Cited

U.S. PATENT DOCUMENTS

| | | |
|---|---|---|
| 2003/0120585 A1 | 6/2003 | Rosenblatt |
| 2003/0208572 A1 | 11/2003 | Shah et al. |
| 2004/0215848 A1 | 10/2004 | Craddock et al. |
| 2005/0100033 A1 | 5/2005 | Arndt et al. |
| 2005/0120160 A1 | 6/2005 | Plouffe et al. |
| 2006/0230185 A1 | 10/2006 | Errickson et al. |
| 2008/0189432 A1 | 8/2008 | Abali et al. |
| 2009/0025007 A1 | 1/2009 | Hara et al. |
| 2009/0077268 A1 | 3/2009 | Craddock et al. |
| 2009/0222640 A1 | 9/2009 | Bauman et al. |
| 2010/0037309 A1 | 2/2010 | Dargis |
| 2010/0153514 A1* | 6/2010 | Dabagh et al. ............ 709/213 |
| 2010/0169494 A1 | 7/2010 | Machulsky et al. |
| 2010/0332657 A1* | 12/2010 | Elyashev et al. ........... 709/226 |
| 2011/0119427 A1* | 5/2011 | Dow et al. ................... 711/6 |
| 2011/0131568 A1 | 6/2011 | Heim |
| 2011/0246669 A1 | 10/2011 | Kanada et al. |
| 2011/0299537 A1 | 12/2011 | Saraiya et al. |
| 2012/0042034 A1 | 2/2012 | Goggin et al. |
| 2012/0173757 A1 | 7/2012 | Sanden |
| 2012/0233282 A1* | 9/2012 | Voccio et al. ............. 709/212 |
| 2012/0265956 A1 | 10/2012 | Nakamichi et al. |
| 2012/0284786 A1 | 11/2012 | Somani et al. |
| 2012/0287931 A1 | 11/2012 | Kidambi et al. |
| 2012/0291024 A1 | 11/2012 | Barabash et al. |
| 2012/0291028 A1 | 11/2012 | Kidambi et al. |
| 2012/0297379 A1 | 11/2012 | Anderson et al. |
| 2013/0055240 A1 | 2/2013 | Gondi |
| 2013/0060947 A1 | 3/2013 | Nelson |
| 2013/0326173 A1* | 12/2013 | Tsirkin ..................... 711/162 |
| 2014/0033201 A1 | 1/2014 | Dawkins et al. |

OTHER PUBLICATIONS

International Searching Authority, International Search Report and Written Opinion for PCT International Patent Application No. PCT/US2013/033753, Jul. 22, 2013, 10 pages.

International Searching Authority, International Search Report and Written Opinion for PCT International Patent Application No. PCT/US2013/033752, Jul. 22, 2013, 12 pages.

International Search Report and Written Opinion dated Jul. 9, 2013, International Application No. PCT/US2013/033755, 10 pgs.

International Search Report and Written Opinion dated Jul. 9, 2013, International Application No. PCT/US2013/033754, 10 pgs.

European Patent Office, International Searching Authority, International Search Report and Written Opinion dated Nov. 9, 2015 for International Application No. PCT/US2015/049193, 11 pages.

Notice of Allowance issued by United States Patent and Trademark Office for U.S. Appl. No. 13/838,275, mailed Apr. 28, 2016, 20 pages.

Notice of Allowance issued by United States Patent and Trademark Office for U.S. Appl. No. 13/838,121, mailed May 17, 2016, 17 pages.

International Search Report and Written Opinion issued by European Patent Office for international patent application No. PCT/US2016/019370, mailed May 12, 2016 (13 pages).

\* cited by examiner

SYSTEM AND METHOD FOR SUPPORTING LIVE MIGRATION OF VIRTUAL MACHINES IN AN INFINIBAND NETWORK

CLAIM OF PRIORITY

This application claims priority on U.S. Provisional Patent Application No. 61/615,731, entitled "SYSTEM AND METHOD FOR SUPPORTING LIVE MIGRATION OF VIRTUAL MACHINES THAT USE RDMA BASED COMMUNICATION" filed Mar. 26, 2012, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to the following patent applications, each of which is hereby incorporated by reference in its entirety:

U.S. patent application titled "SYSTEM AND METHOD FOR SUPPORTING LIVE MIGRATION OF VIRTUAL MACHINES IN A VIRTUALIZATION ENVIRONMENT", application Ser. No. 13/838,121, filed Mar. 15, 2013;

U.S. patent application titled "SYSTEM AND METHOD FOR SUPPORTING LIVE MIGRATION OF VIRTUAL MACHINES BASED ON AN EXTENDED HOST CHANNEL ADAPTOR (HCA) MODEL", application Ser. No. 13/838,275, filed Mar. 15, 2013; and U.S. patent application titled "SYSTEM AND METHOD FOR PROVIDING A SCALABLE SIGNALING MECHANISM FOR VIRTUAL MACHINE MIGRATION IN A MIDDLEWARE MACHINE ENVIRONMENT", application Ser. No. 13/838,502, filed Mar. 15, 2013.

FIELD OF INVENTION

The present invention is generally related to computer systems, and is particularly related to supporting computer system virtualization.

BACKGROUND

As larger cloud computing architectures are introduced, the performance and administrative bottlenecks associated with the traditional network and storage have become a significant problem. The InfiniBand (IB) technology has seen increased deployment as the foundation for a cloud computing fabric. This is the general area that embodiments of the invention are intended to address.

SUMMARY

Described herein are systems and methods for supporting virtual machine live migration in a network. A plurality of hosts can be interconnected via the network. Each host contains one or more virtual machines. At least one virtual machine operates to perform a live migration from a first host to a second host. The virtual function, which is attached to a queue pair (QP), can be supported by a host channel adapter (HCA) on a host.

DETAILED DESCRIPTION

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one.

The description of the invention as following uses the Infiniband (IB) network as an example for a high performance network. It will be apparent to those skilled in the art that other types of high performance networks can be used without limitation. Also, the description of the invention as following uses the Xen virtualization model as an example for a virtualization model. It will be apparent to those skilled in the art that other types of virtualization models can be used without limitation.

Described herein are systems and methods that can support virtual machine (VM) live migration in a network.

In accordance with an embodiment of the invention, virtualization can be beneficial to efficient resource utilization and elastic resource allocation in cloud computing. Live migration makes it possible to optimize resource usage by moving virtual machines (VMs) between physical servers in an application transparent manner. Thus, virtualization can enable consolidation, on-demand provisioning of resources, and elasticity through live migration.

InfiniBand (IB) Architecture

The IB Architecture is a serial point-to-point full-duplex technology. The IB networks can be referred to as subnets, wherein a subnet consists of a set of hosts interconnected using switches and point to point links. An IB subnet can include at least one subnet manager (SM), which is responsible for initializing and bringing up the network, including the configuration of all the switches, routers and host channel adaptors (HCAs) in the subnet.

IB supports a rich set of transport services in order to provide both remote direct memory access (RDMA) and traditional send/receive semantics. Independent of the transport service used, the IB HCAs communicate using queue pairs (QPs). A QP is created during the communication setup, and can have a set of initial attributes such as QP number, HCA port, destination LID, queue sizes, and transport service that are supplied. An HCA can handle many QPs, each QP consists of a pair of queues, such as a send queue (SQ) and a receive queue (RQ), and there is one such pair present at each end-node participating in the communication. The send queue holds work requests to be transferred to the remote node, while the receive queue holds information on what to do with the data received from the remote node. In addition to the QPs, each HCA has one or more completion queues (CQs) that are associated with a set of send and receive queues. The CQ holds completion notifications for the work requests posted to the send and receive queue. Even though the complexities of the communication are hidden from the user, the QP state information is kept in the HCA.

Input/Output (I/O) Virtualization

I/O Virtualization (IOV) can provide availability of I/O by allowing VMs to access the underlying physical resources. The combination of storage traffic and inter-server communication impose an increased load that may overwhelm the I/O resources of a single server, leading to backlogs and idle processors as they are waiting for data. With the increase in number of I/O requests, IOV can provide availability; and can improve performance, scalability and flexibility of the (virtualized) I/O resources to match the level of performance seen in modern CPU virtualization.

There can be different types of IOV technologies, such as emulation, paravirtualization, direct assignment (DA), and single root-I/O virtualization (SR-IOV). Among these IOV technologies, SR-IOV can extend the PCI Express (PCIe) specification with the means to allow direct access to a single physical device from multiple VMs while maintaining near to native performance. Thus, SR-IOV can provide good performance and scalability.

SR-IOV allows a PCIe device to expose multiple virtual devices that can be shared between multiple guests by allocating one virtual device to each guest. Each SR-IOV device has at least one physical function (PF) and one or more associated virtual functions (VF). A PF is a normal PCIe function controlled by the virtual machine monitor (VMM), or hypervisor, whereas a VF is a light-weight PCIe function. Each VF has its own base address (BAR) and is assigned with a unique requester ID that enables I/O memory management unit (IOMMU) to differentiate between the traffic streams to/from different VFs. The IOMMU also apply memory and interrupt translations between the PF and the VFs.

There can be different types of SR-IOV models, e.g. a shared port model and a virtual switch model. In the shared port model, all the VFs can share a single port address and a single QP name space, and only a single HCA port is exposed to the network. In the virtual switch model, each VF is a virtual HCA that contains a unique port address and a unique QP name space, and one HCA for each VF on the device is exposed to the network. Thus, the virtual switch model can simplify IOV with more complex hardware.

The use of an SR-IOV capable device can yield near native performance and improved scalability. On the other hand, SR-IOV may not be fully incompatible with live migration and check-point/restart mechanisms.

Live Migration

In accordance with an embodiment of the invention, the virtualization environment allows the live migration of virtual machines, i.e. moving a running VM from one machine to another without disrupting the applications running on the VM.

Figure 1:
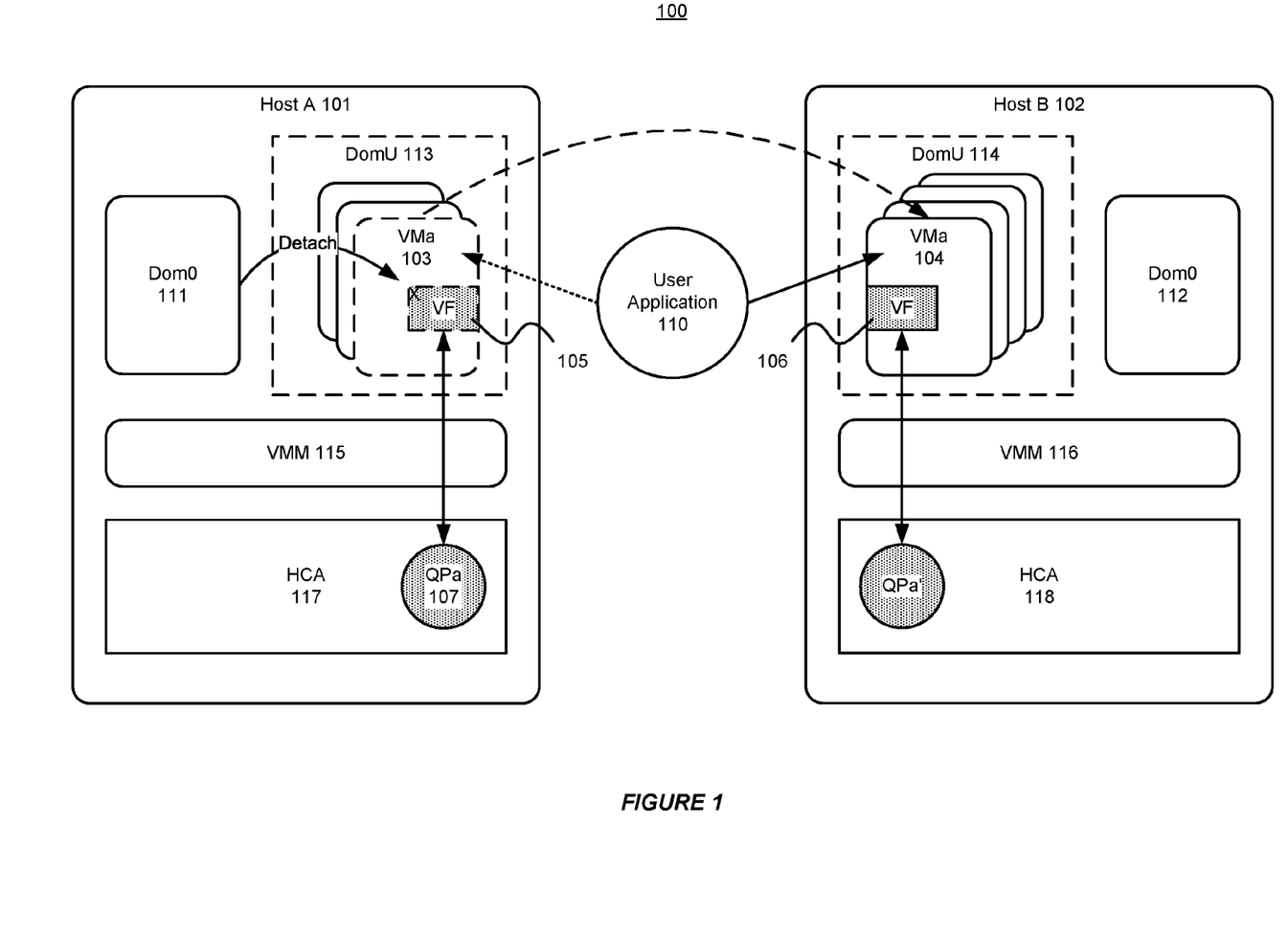
FIG. 1 shows an illustration of the live migration of a virtual machine in a virtualization environment, in accordance with an embodiment of the invention.

FIG. 1 shows an illustration of the live migration of a virtual machine in a virtualization environment, in accordance with an embodiment of the invention. As shown in FIG. 1, a plurality of hosts, e.g. hosts A-B 101-102, can be interconnected via an IB network 100. A VM, e.g. VMa 103 can migrate from a host, e.g. host A 101, to another host, e.g. host B 102 (as VMa 104).

Further as shown in FIG. 1, each host can include a VMM that uses a HCA. For example, the VMM A 115 in host A 101 uses a HCA 117 and the VMM B 116 in host B 102 uses a HCA 118. Additionally, the VMa 103 can be attached with a VF, e.g. VF 105, which is connected to a queue pair, e.g. QPa 107.

From the VMM perspective, a three-stage migration process can be performed to migrate the VMa 103, which is attached with a VF 105, from the host A 101 to the host B 102.

Stage 1: Detach the VF 105 from the VMa 103.
Stage 2: Migrate the VMa 103 from the host A 101 to the host B 102 (as VMa 104).
Stage 3: Attach a new VF 106 to the VMa 104.

Using the Xen virtualization model, each host can include a privileged domain and a guest domain that includes one or more guest VMs. For example, the host A 101 can include a privileged domain, Dom0 111, and a guest domain, Dom U 113, and the host B 102 can include a privileged domain, Dom0 112, and a guest domain, Dom U 114.

As shown in FIG. 1, the privileged domain, Dom0 111, can generate a virtual interrupt to the guest domain, DomU 113, for detaching a VF 105 by unloading its device driver. For example, a hot-plug mechanism supported by the hypervisors to disconnect a PCIe device can be used to detach the VF 105.

In accordance with an embodiment of the invention, the system can use a PID-QPN translation table for detaching a VF 105 from the VMa 103. When a QPa 107 is created, the PID of the user application 110 can be registered in the PID-QPN translation table, which resides in the kernel space of the VMa 103. Then, based on the PID-QPN translation table, which can be shown in FIG. 3, the VF 105 can be detached successfully in the situation when an active QP, e.g. QPa 107, exists and connects to the VF105. Furthermore, a VF 106, which contains a new virtual globally unique identifier (vGUID) and a new local identifier (LID), can be attached to the VMa 104, after the VMa 103 migrates from host A 101 to host B 104 (as the VMa 104).

In an IB network, the QP resources can be managed directly by the hardware, and may only be accessed by software through an opaque handle. Thus, when the VF 106 is attached to VMa 104, the user application may have an invalid opaque handle that is pointed to QPa 107. This is because that the virtual address for the physical memory pinned by the user process has changed and the opaque handle created during the memory registration can become invalid.

In accordance with an embodiment of the invention, a translation mechanism can be used to handle the location dependent resources for the QP. Each QP context contains location-dependent attributes that are associated with an HCA and host. Using the translation mechanism, these location-dependent attributes can be recreated after migration. Furthermore, in order to maintain application transparency, the virtual addresses in the user process can be reallocated after the migration in order to have them pinned to the correct physical memory at the new location.

Additionally, IB network can use a deterministic state for suspending and resuming a QP before and after the live migration of a VM. This deterministic state can be used to migrate QP state between two different physical devices and prevent any dropped packets or out-of-order packets that may cause a fatal error in the IB network 100, which may be a lossless network. Then, at the time of migration, the migrating VMa 103 can migrate the outstanding packets in each QP that has not yet been transferred through the wire.

Figure 2:
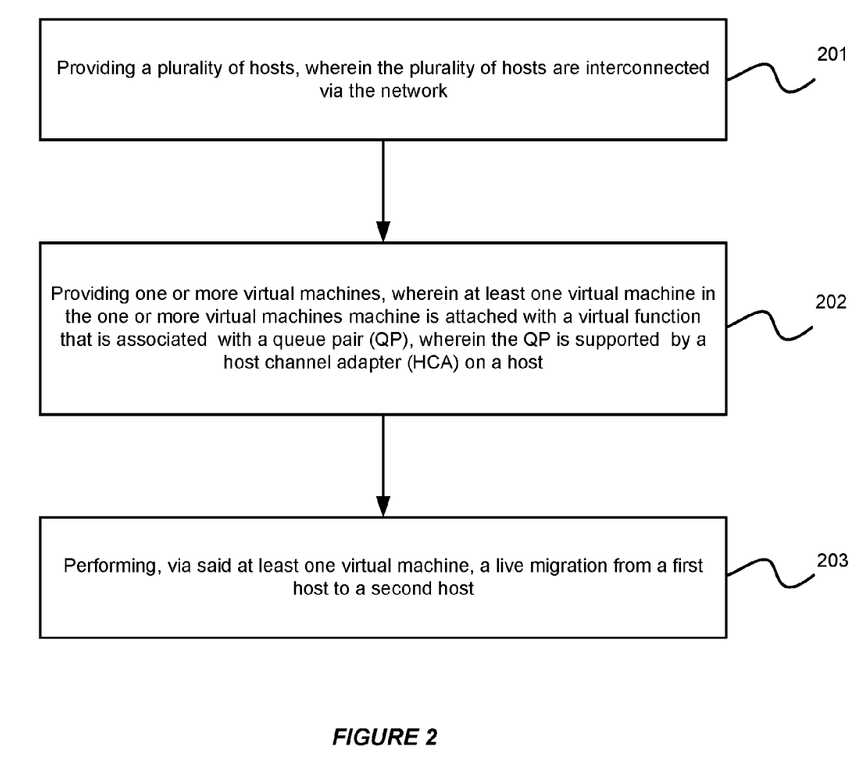
FIG. 2 illustrates an exemplary flow chart for supporting the live migration of a virtual machine in a virtualization environment, in accordance with an embodiment of the invention.

FIG. 2 illustrates an exemplary flow chart for supporting the live migration of a virtual machine in a virtualization environment, in accordance with an embodiment of the invention. As shown in FIG. 2, at step 201, a plurality of hosts that contains one or more virtual machines are inter-connected via the network. Then, at step 202, at least one virtual machine is attached with a virtual function that is associated with a queue pair (QP), wherein the QP is supported by a host channel adapter (HCA) on a host. Furthermore, at step 203, said at least one virtual machine can perform a live migration from a first host to a second host.

The Process ID (PID) to Queue Pair Number (QPN) Translation Table

Figure 3:
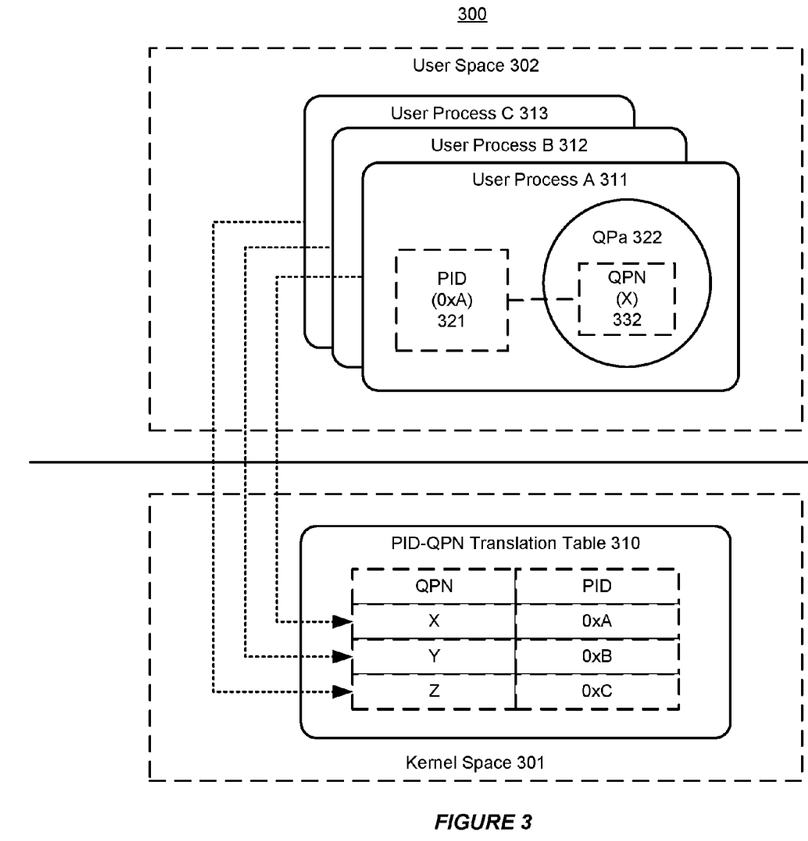
FIG. 3 shows an illustration of a process ID (PID) to queue pair number (QPN) translation table, in accordance with an embodiment of the invention.

FIG. 3 shows an illustration of a process ID (PID) to queue pair number (QPN) translation table, in accordance with an embodiment of the invention. As shown in FIG. 3, a virtual machine (VM) environment 300 can include a kernel space 301 and a user space 302.

The user space 302 can include one or more user processes, e.g. user processes A-C 311-313, each of which can be assigned with a process ID (PID). For example, a process ID (PID) 321 can be assigned to a user process A 311.

Furthermore, each user processes A-C 311-313, can use one or more queue pairs (QPs) to communicate with other processes in the system. For example, the user process A 311 can use QPa 322, which is associated with a queue pair number (QPN) 332.

In order to identify the correct user process before and after the live migration of a virtual machine 300, the kernel space 301 can maintain a translation table 310 that relates the QPs for the virtual machine 300 to the different user process that use the QPs.

For example, the translation table 310 can map a QPN 332 (with a value x) for the QPa 322 to the PID 321 (with a value 0xA) that is assigned to the user process A 311. Additionally, the translation table 310 can have entries for mapping QPs to other user processes, such as user processes B-C 312-313.

In accordance with an embodiment of the invention, The PID 321 for the user process A 311 can be registered with the translation table 310 when the QPa 322 is created, and the PID 321 for the user process A 311 can be unregistered when the QPa 322 is destroyed.

In the example of Xen-based architecture, a privileged domain in the virtual machine 300 can try to detach an IB VF when a registered QPN 332 exists, by triggering an event for notifying the user process A 311 with the registered PID 321 to release the pinned memory. After the pinned memory by the user process A 311 is released, the QPa 322 belonging to the user process A 311 can be suspended until it receives a resume event. As a result, the kernel space 301 module can be unloaded and the VF connected to the QPa 322 can be detached from the VM 300 successfully.

Furthermore, in order to resolve the lack of interaction between the user space 302 and the kernel space 301, the system can configure a user space callback function that can be triggered by the kernel space 301 before de-registering the PCI IB module.

Location Dependent Communication Resources

Figure 4:
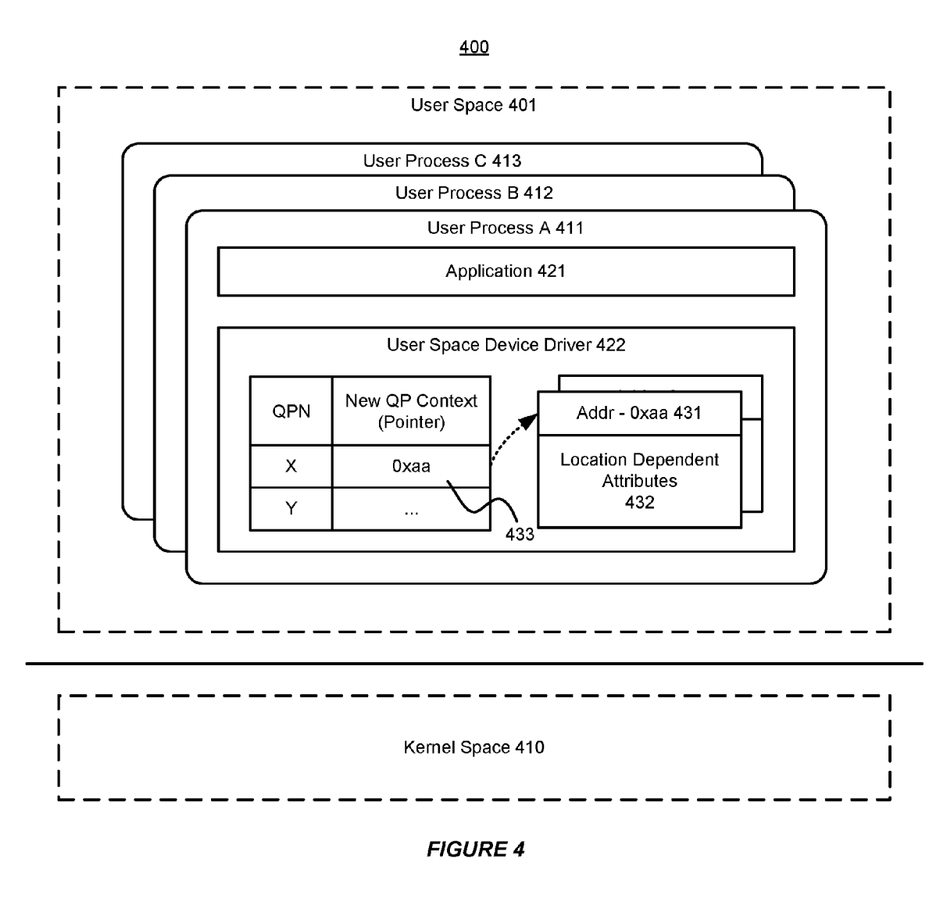
FIG. 4 shows an illustration of reallocating location dependent communication resources, in accordance with an embodiment of the invention.

FIG. 4 shows an illustration of reallocating location dependent communication resources, in accordance with an embodiment of the invention. As shown in FIG. 4, the virtual machine environment 400 can include a kernel space 410, and a user space 401 with one or more user processes, e.g. user processes A-C 411-413.

In order to avoid conflictions with other QPNs at the destination host after migration, each user process A-C 411-413 can have a mapping table that can minimize the time to search and retrieve the updated QP attributes.

The user process A 411 can have a mapping table 433, which can be implemented as part of the user space library, e.g. a user space device driver 422, for the user process A 411. Additionally, the size of the mapping table 433 can be maintained in relative small size, since each user process A-C 411-413 can have its own mapping table.

Furthermore, the mapping table 433 can be used to retrieve the updated location dependent QP attributes after a new IB VF is attached at the destination host. For example, instead of using one mapping table for each QP attribute, the mapping table 433 may only contain a pointer to the new QP attributes that are stored in the memory (with the old QPN used as the key). As shown in FIG. 4, in the mapping table 433, a first QPN value, X, is associated with a QP context pointer, Oxaa, which stores the address 431 of the location dependent attributes 432.

In accordance with an embodiment of the invention, the QP context can include several location-dependent attributes 432, such as the local identifier (LID), queue pair number (QPN), remote key (rkey), and local key (lkey). The LID is a local address that is assigned to each HCA port by the subnet manager during subnet initialization. The QPN is an identifier that represents a QP and it is only unique within a HCA. Both the local key (lkey) and the remote key (rkey) are location-dependent attributes that need to be changed after migration. They are the authorization keys to access the local and the remote memory regions, respectively.

Alternatively, there can be other approaches for remapping these QP attributes. One approach is to offload the remapping mechanism to the hardware. This approach may require modifications to the hardware and software architecture. Another alternative is to place the mapping table in the kernel and remap the cached QP attributes to a new set of QP attributes after the VF is reattached. This approach may require a mapping table for every attribute: LID, rkey, lkey and QPN. Additionally, the QPN may not be unique within the subnet and might cause a conflict after the migration.

Thus, the location dependent resources, such as the QP attributes 432, can be cached by the user application 421. Furthermore, after the QP is established, the time-critical operations by the user application 421 can be performed directly based on the libraries in the user space 401 without the interception from the kernel 410.

Queue Pair (QP) State

Figure 5:
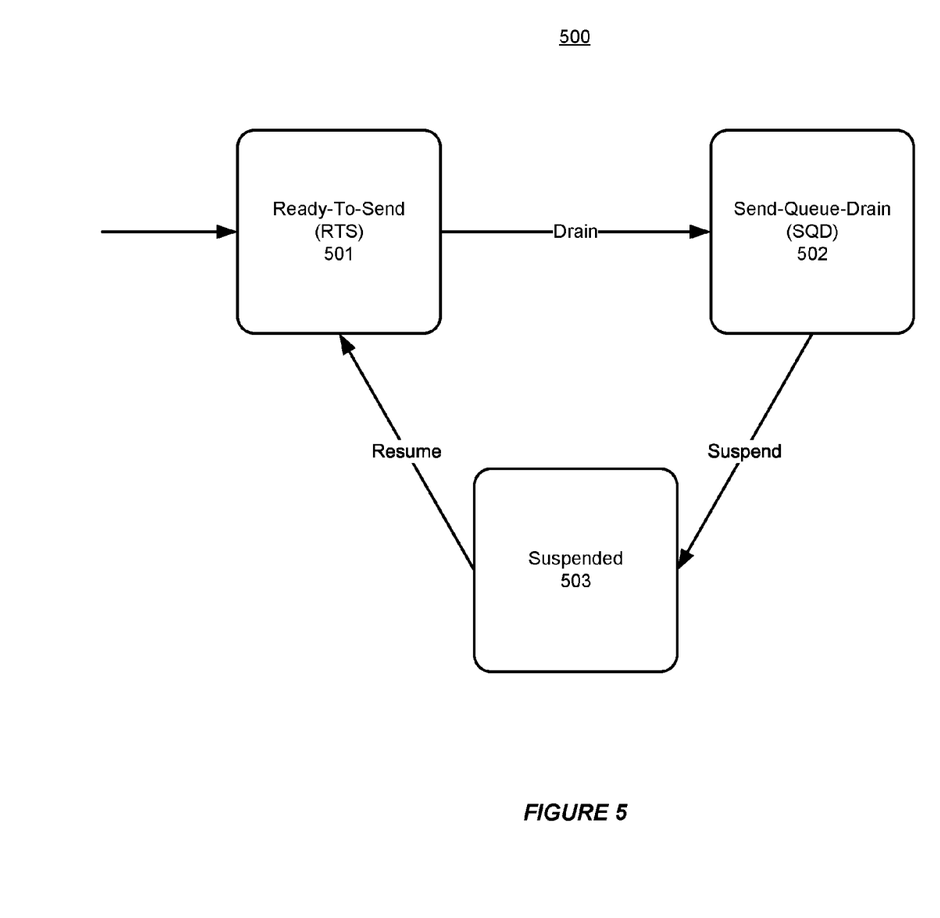
FIG. 5 shows an illustration of using a deterministic state to suspend and resume a queue pair (QP), in accordance with an embodiment of the invention.

FIG. 5 shows an illustration of using a deterministic state to suspend and resume a queue pair (QP), in accordance with an embodiment of the invention. As shown in FIG. 5, the network model 500 allows a queue pair (QP) to be in various defined states, such as a ready-to-send (RTS) state 501 and a send-queue-drain (SQD) state 502. Additionally, the network model 500 can use a deterministic state, e.g. a suspended state 503, to suspend and resume the QP before and after a live migration.

In accordance with an embodiment of the invention, the suspended state 503 can be based on the send-queue-drain (SQD) state 502. Before a QP is allowed to transit from a RTS state 501 to the SQD state 502, all outstanding operations in the work queues of the QP are drained successfully. Thus, the SQD state 502 can ensure that all outstanding send operations are completed before a QP can be temporarily suspended. Using this approach, the QP can be in a deterministic state where no in-flight packets exist and the QP can safely be suspended and migrated.

The Late-detach Migration Process

In accordance with an embodiment of the invention, the virtual environment can reduce the service downtime during the VM migration using a late-detach approach.

Figure 6:
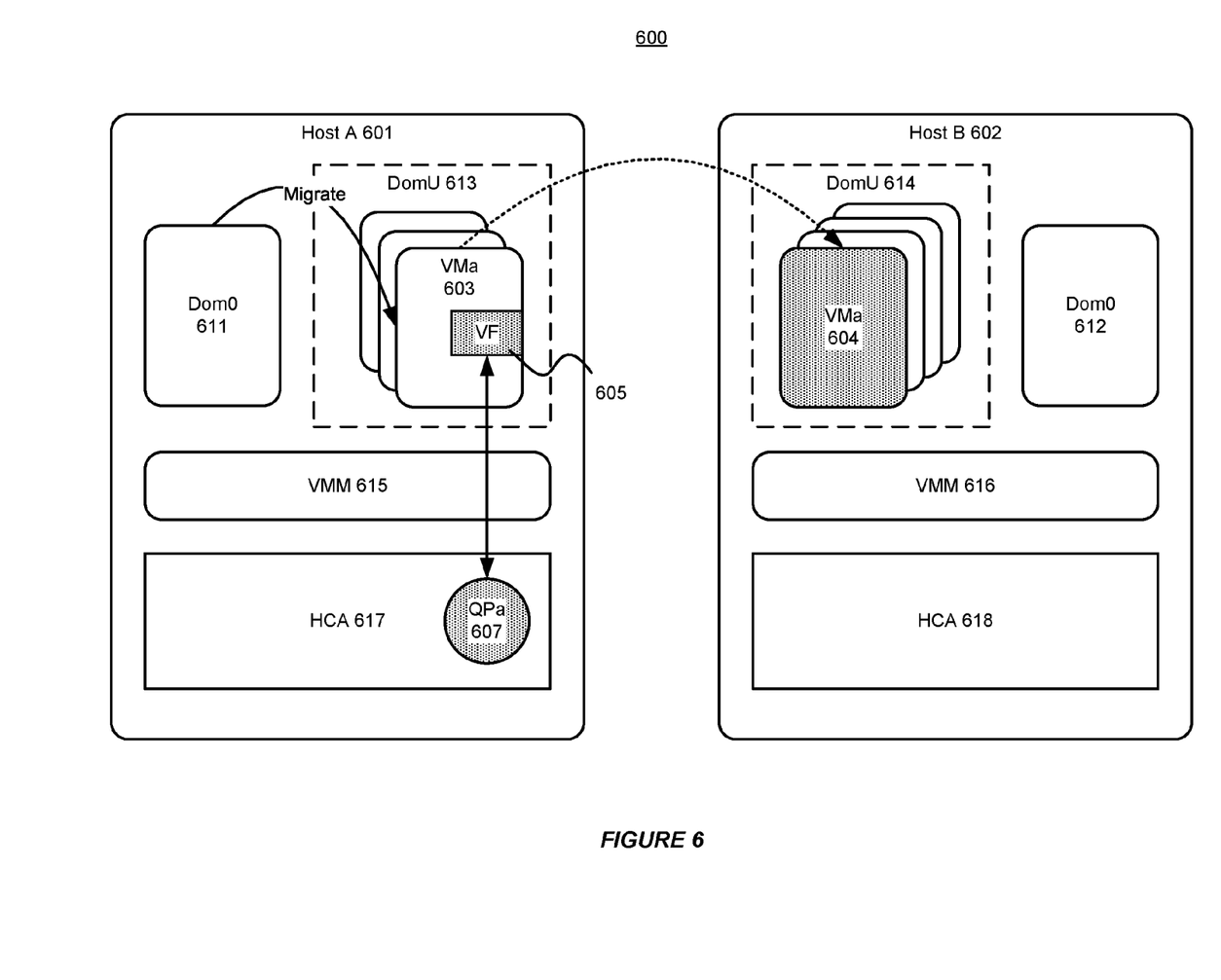
FIG. 6 shows an illustration of the live migration of a virtual machine using a bottom-up approach, in accordance with an embodiment of the invention.

FIG. 6 shows an illustration of the live migration of a virtual machine using a bottom-up approach, in accordance with an embodiment of the invention. As shown in FIG. 6, a plurality of hosts, e.g. host A-B 601-602, can be interconnected via an IB network 600. Each host A-B 601-602 can include one or more virtual machine monitors (VMMs), such as VMM 615-616, that manages one or more virtual machines (VMs).

A virtual machine (VM), e.g. the VMa 603 in DomU 613, can be attached with a virtual function (VF) 605, which connects to a queue pair (QP), e.g. QPa 607, on HCA 617. The privilege domain, Dom0 611, can initiate the migration of the VMa 603 from host A 601 to host B 602 (as VMa 604).

As shown in FIG. 6, the system allows the VMa 603 to migrate without first detaching the VF 605. Then, the system can detach the VF 605 after the VMa 604 is set up on the destination host B 602 (which includes a privilege domain, Dom0 612, and a guest domain, Dom U 614, supported by VMM616 and HCA 618).

Thus, the service downtime can be reduced since the IB device can remain operational until the VM is suspended. For example, the QPa 607 on HCA 617 can remain functional until the start of the stop-and-copy stage.

Figure 7:
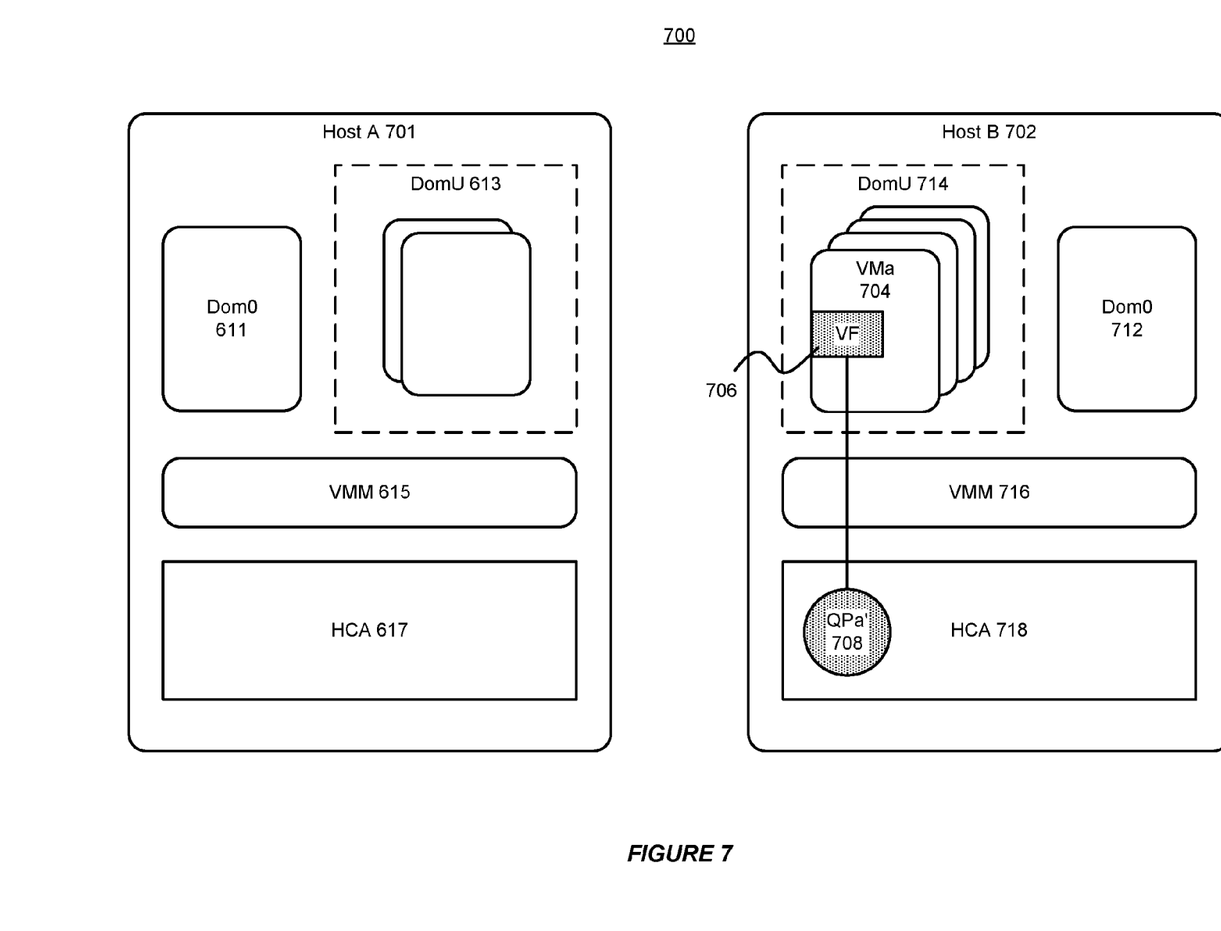
FIG. 7 shows an illustration of reactivating the virtual machine after migration, in accordance with an embodiment of the invention.

FIG. 7 shows an illustration of reactivating the virtual machine after migration, in accordance with an embodiment of the invention. As shown in FIG. 7, a plurality of hosts, e.g. host A-B 701-702, can be interconnected via an IB network 700. Each host A-B 701-702 can include one or more virtual machine monitors (VMMs), such as VMM 615 on the host A 701 and VMM 716 on the host B 702, which manages one or more virtual machines (VMs). Additionally, each host A-B 701-702 can include one or more HCAs, such as HCA 717 on the host A 701 and HCA 718 on the host B 702.

After the VMa 704 migrates to the destination host B 702, a new VF 706 can be attached (or reattached) to the VMa 704, before the VMa 704 is resumed. The new VF 706 can connect to a newly created QPa' 708 on HCA 718.

Using the Xen virtualization model, the privilege domain, e.g. Dom0 712, on the host B 702 can attach the new VF 706 at the final stage of the restoration of the VMa 704 in the guest domain, DomU 714, instead of initializing the VF 706 during the early restoration. Furthermore, Dom0 712 can perform a reconfiguration process that may include recreating the hardware dependent resources and reestablishing the connection with the remote QP.

Reestablishing a Remote Connection

The IB network can provide multiple connection-oriented transport services. The system can recreate the QP on the destination host and re-establish the connection with the remote QP after the migration is completed, in the situation when the VM migration happens at a time when both QPs are still in operation, e.g. in a RTS state.

Figure 8:
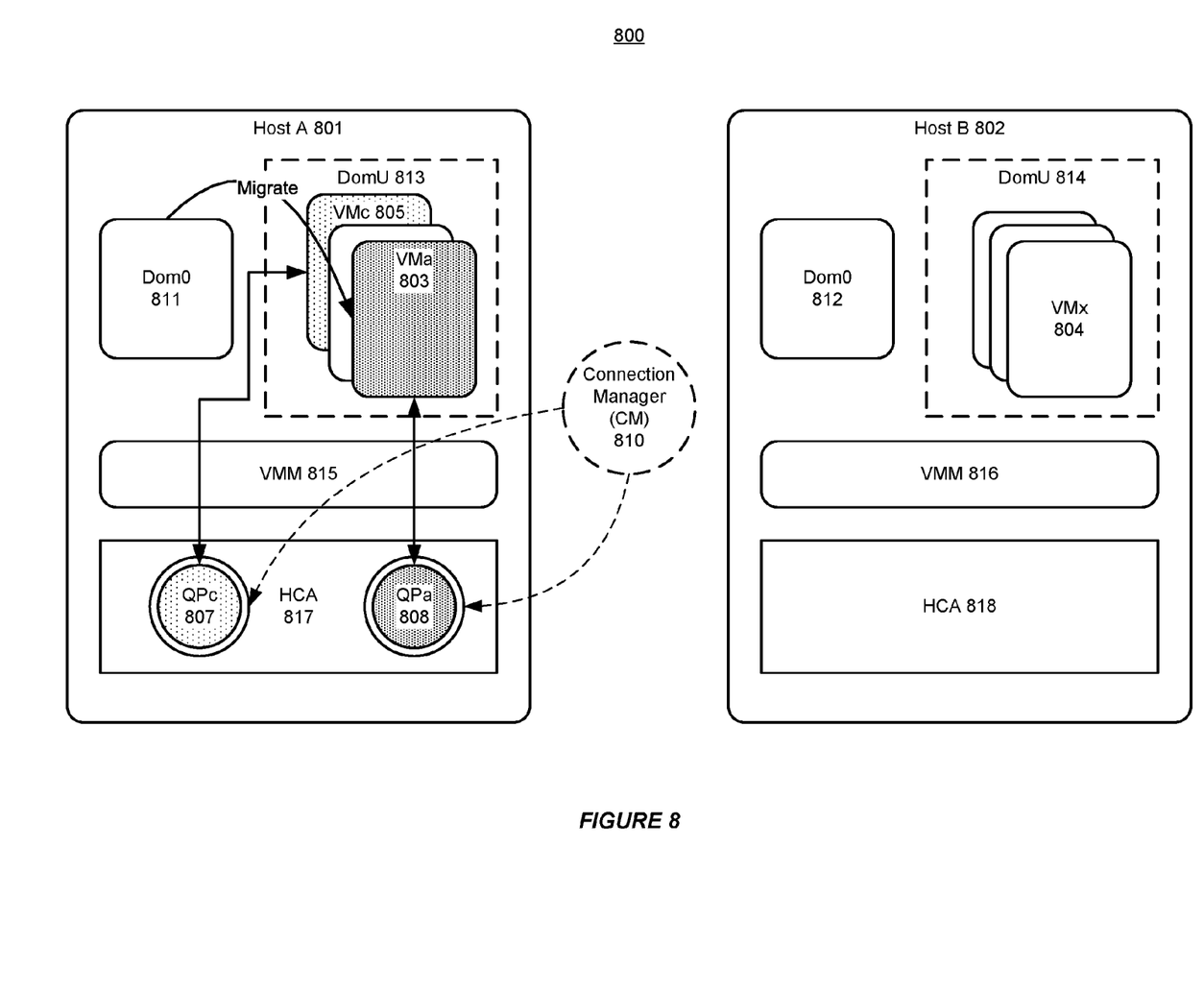
FIG. 8 shows an illustration of two queue pairs (QPs) before the live migration of a virtual machine, in accordance with an embodiment of the invention.

FIG. 8 shows an illustration of two queue pairs (QPs) before the live migration of a virtual machine, in accordance with an embodiment of the invention. As shown in FIG. 8, a plurality of hosts, e.g. host A-B 801-802, can be interconnected via the IB network 800. Each host A-B 701-702 can include one or more virtual machine monitors (VMMs), such as VMMs 815-816, and one or more HCAs, such as HCAs 817-818.

In the example as shown in FIG. 8, a QPa 808, which is associated with the VMa 803 on the host A 801, can be in communication with a peer QP, e.g. QPc 807, which is associated with the VMc 805, before the live migration of VMa 803 from the host A 801 to the host B 802.

During the live migration of VMa 803, a communication manager (CM) 810 can be configured to tolerate the device removal event, in order to successfully migrate the VMa 803. The CM 810 can disconnect the connection after the device is removed and can restart the connection once a new device is reattached. Additionally, the system can implement a reconnection mechanism, e.g. in the user space library.

As shown in FIG. 8, in the example of a Xen-based architecture, the privileged domain, Dom 0 811 on the host A 801, can initiate the migration of VMa 803 in a guest domain, DomU 813, to the host B 802. Also, the host B 802 can include a privileged domain, Dom 0 812, and a guest domain, DomU 814, which includes one or more VMs (e.g. VMx 804).

In accordance with an embodiment of the invention, there can be a one-to-one relationship between a VM and a guest domain (i.e. DomU) in a virtualization model, such as the Xen model. Furthermore, the DomU, which is a resource container on the physical server that hosts a VM under the control of the VMM/Dom0, can be used to represent a Xen notion of a VM. Additionally, one-to-many, or many-to-one relationship may be existing between the VMs and the guest domains in other virtualization models without limitation. For example, a guest domain may be able to host different VMs.

Furthermore, Dom 0 811 can execute the PCI-detach script to unplug a VF from the VMa 803. This operation can also trigger a suspend stage, where the kernel IB PCI module on VMa 803 can verify that the PID exists in the QPN-PID mapping table 310 and can signal a suspend event to notify the user process in VMa 803.

The migrating VMa 803 can save the QP attributes and the out-of-band socket address to VMc 805 before the pinned memory is released. Here, the socket address can be used as a location independent address, for the VM, that does not change after the migration. The location independent socket address can be used to identify the VMs, when vGUIDs are not used as a unique and static "name" throughout the VM lifecycle.

Then, after the pinned memory is released, the VF can be successfully detached from the VMa 803 and the user process associated with the VMa 803 can remain in the suspend state until it receives a resume event.

When the user process receives the suspend event, it can set the suspend flag and stops the remaining send operations. Then, the user process can generate a suspend message, using a reliable connection, to notify the user library on the VMc 805, that QPa 808 is going to be suspended. When the work queues on both QPs 807-808 have been drained, the VMc 805 can reset the QPc 807 and can wait for a new CM event.

Furthermore, during the live migration, the migrating VMa 803 can prevent the QPc 807 from sending data to the migrating VMa 803, and can forward a reliable connection (RC) suspend message to notify the QPc 807 about the migration. After the QPc 807 receives the message, it can ensure that all work queues are drained successfully. Then, the QPc 807 can transit to the RESET state and waits for a new CM event in order to resume the communication.

Thus, the system can maintain the connection between VMa 803 and VMc 805 after the migration.

Figure 9:
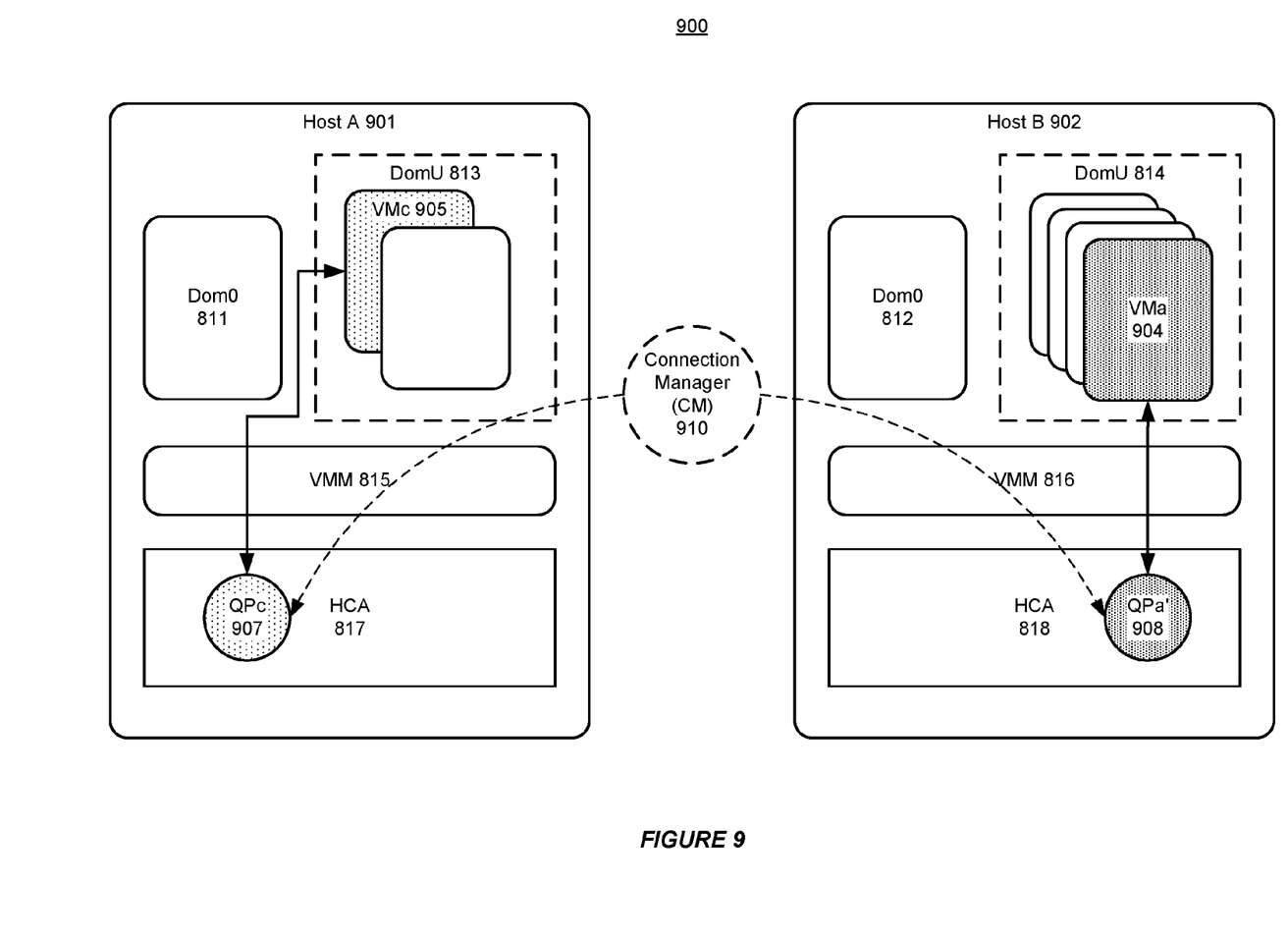
FIG. 9 shows an illustration of two queue pairs (QPs) in communication after the live migration of a virtual machine, in accordance with an embodiment of the invention.

FIG. 9 shows an illustration of two queue pairs (QPs) in communication after the live migration of a virtual machine, in accordance with an embodiment of the invention. As shown in FIG. 9, a plurality of hosts, e.g. host A-B 901-902, can be interconnected via the IB network 900.

The VMa 904 on the host B 902 is migrated from the host 901. Then, the system can attach a new VF to VMa 904, and can trigger the resume stage. The system can signal a resume event for notifying the user process in VMa 904 to set the resume flag and to create a new QP, e.g. QPa' 908. Furthermore, a pointer to the new QP attributes can be added to the mapping table with the previous QPN used as the retrieval key.

After the CM 910 reestablishes the connection with the VMc 905 (or VMc 805 in FIG. 8) using a location independent addresses for the VM, the communication can be resumed by exchanging QP attributes and transferring both QPs 907-908 into the RTS state. At this point, the application can continue to use the cached QP attributes, with all operations intercepted by the user library to retrieve the correct QP attributes from the mapping table.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting virtual machine live migration in a network, comprising:
   one or more microprocessors;
   a plurality of hosts, running on the one or more microprocessors, wherein the plurality of hosts are interconnected via the network;
   one or more virtual machines, wherein at least one virtual machine in the one or more virtual machines operates to perform a migration of the at least one virtual machine from a first host to a second host,
   wherein said at least one virtual machine is attached with a virtual function that is associated with a queue pair (QP), wherein the QP is supported by a host channel adapter (HCA) at the first host, and wherein one or more attributes of the queue pair (QP) associated with the HCA at the first host are registered in a table; and
   wherein during the migration of the at least one virtual machine from the first host to the second host
      the virtual function is detached from the virtual machine at the first host;
      a queue pair (QP) is newly created for use by the second host, using the one or more attributes registered in the table, and is associated with a HCA at the second host:
      the virtual machine is migrated to the second host; and
      a new virtual function is attached to the migrated virtual machine and the newly created QP at the second host.

2. The system according to claim 1, further comprising:
at least one virtual machine monitor that manages the one or more virtual machines.

3. The system according to claim 1, wherein:
said virtual function is provided in an input/output (I/O) virtualization model.

4. The system according to claim 1, wherein:
said at least one virtual machine includes
   a user space, wherein the user space includes one or more user processes, each of which is associated with a process identification number (PID), and
   a kernel space, wherein the kernel space includes a translation table as the table and maps a PID to a queue pair number (QPN), and wherein the translation table is referenced to recreate the queue pair (QP) with the one or more attributes on the second host when the virtual function is detached from the at least one virtual machine on the first host and the new virtual function is attached to the migrated virtual machine on the second host.

5. The system according to claim 1, wherein:
a late-detach migration process is used to reduce network/service down-time during the migration of the at least one virtual machine from the first host to the second host.

6. The system according to claim 1, wherein:
one or more location-dependent QP attributes can be updated using the table after the at least one virtual machine is migrated from the first host to the second host.

7. The system according to claim 6, wherein:
each user process in the user space include a mapping table as the table and operates to search and retrieve the updated one or more location-dependent QP attributes for setup of communications of the queue pair (QP) on the second host.

8. The system according to claim 1, wherein:
QP state information can be migrated along with an image of said at least one virtual machine in order to reallocate physical resources of QPs.

9. The system according to claim 1, wherein:
a peer QP can halt communication with the QP during the migration of said at least one virtual machine.

10. The system according to claim 9, wherein:
a connection manager (CM) can reestablish a new connection between the migrated QP and the peer QP after the migration is completed.

11. The system according to claim 1, wherein
the table is used to maintain application transparency and pin virtual addresses in the user process to physical memory at a new location associated with the second host after the migration.

12. A method for supporting virtual machine live migration in a network, comprising:
providing a plurality of hosts, wherein the plurality of hosts are interconnected via the network;
providing one or more virtual machines, wherein the at least one virtual machine in the one or more virtual machines is attached with a virtual function that is associated with a queue pair (QP) in a first host, wherein the QP is supported by a host channel adapter (HCA) at the first host;
registering one or more attributes of the queue pair (QP) associated with the HCA at the first host in a table; and
performing, via said at least one virtual machine, a migration from the first host to a second host that includes:
detaching the virtual function from the virtual machine at the first host;
using the one or more attributes registered in the table to newly create a queue pair (QP) for use by the second host and is associated with a HCA at the second host;
migrating the virtual machine to the second host; and
attaching a new virtual function to the migrated virtual machine and the newly created QP at the second host.

13. The method according to claim 12, further comprising:
providing at least one virtual machine monitor that manages the one or more virtual machines.

14. The method according to claim 12, further comprising:
including a user space in said at least one virtual machine, wherein the user space includes one or more user processes, each of which is associated with a process identification number (PID), and
including a kernel space in said at least one virtual machine, wherein the kernel space includes a translation table as the table and maps a PID to a queue pair number (QPN), and wherein the translation table is referenced to recreate the queue pair (QP) with the attribute on the second host when the virtual function is detached from the at least one virtual machine on the first host and the new virtual function is attached to the migrated virtual machine on the second host.

15. The method according to claim 12, further comprising:
using a late-detach migration process to reduce network/service down-time during the migration of the at least one virtual machine from the first host to the second host.

16. The method according to claim 12, further comprising:
updating one or more location-dependent QP attributes using the table after the at least one virtual machine is migrated from the first host to the second host.

17. The method according to claim 16, further comprising:
using a mapping table as the table and associating the mapping table with each user process in the a user space of the at least one virtual machine, wherein the mapping table operates to search and retrieve the updated one or more location-dependent QP attributes for the setup of communications of the queue pair (QP) on the second host.

18. The method according to claim 12, further comprising:
migrating QP state information along with an image of said at least one virtual machine in order to reallocate physical resources of QPs.

19. The method according to claim 12, further comprising:
configuring a peer QP to halt communication with the QP during the migration of said at least one virtual machine.

20. A non-transitory machine readable storage medium having instructions stored thereon that when executed cause a system to perform the steps comprising:
providing a plurality of hosts, wherein the plurality of hosts are inter-connected via the network;
providing one or more virtual machines, wherein the at least one virtual machine in the one or more virtual machines is attached with a virtual function that is associated with a queue pair (QP) in a first host, wherein the QP is supported by a host channel adapter (HCA) at the first host;
registering one or more attributes of the queue pair (QP) associated with the HCA at the first host in a table; and
performing, via said at least one virtual machine, a migration from the first host to a second host that includes:
detaching the virtual function from the virtual machine at the first host;
using the one or more attributes registered in the table to newly create a queue pair (QP) for use by the second host and is associated with a HCA at the second host;
migrating the virtual machine to the second host; and
attaching a new virtual function to the migrated virtual machine and the newly created QP at the second host.

* * * * *